United States Patent

Murakawa et al.

(10) Patent No.: US 11,915,384 B2
(45) Date of Patent: Feb. 27, 2024

(54) ESTIMATION OF OPTIMAL RASTERIZATION DISTORTION FUNCTION FROM IMAGE DISTORTION PROPERTY

(71) Applicant: Sony Interactive Entertainment Inc., Tokyo (JP)

(72) Inventors: Jun Murakawa, San Mateo, CA (US); Sagnik Chowdhury, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 50 days.

(21) Appl. No.: 17/237,508

(22) Filed: Apr. 22, 2021

(65) Prior Publication Data

US 2022/0343458 A1    Oct. 27, 2022

(51) Int. Cl.
*G06T 3/40*     (2006.01)
*G06T 3/00*     (2006.01)

(52) U.S. Cl.
CPC ............. *G06T 3/40* (2013.01); *G06T 3/0093* (2013.01)

(58) Field of Classification Search
CPC ........... G06T 3/40; G06T 3/0093; G06T 5/00; G06T 3/00; G06T 1/00; G06T 11/00; G06T 5/006; G02B 2027/014
See application file for complete search history.

(56) References Cited

U.S. PATENT DOCUMENTS

| | | | | |
|---|---|---|---|---|
| 10,546,365 | B2 * | 1/2020 | Mantor | G06T 15/005 |
| 2011/0216832 | A1 * | 9/2011 | Wang | H04N 19/57 |
| | | | | 375/E7.125 |
| 2013/0321674 | A1 * | 12/2013 | Cote | H04N 23/843 |
| | | | | 382/167 |
| 2014/0126006 | A1 * | 5/2014 | Yoshida | G06F 3/1285 |
| | | | | 358/1.9 |
| 2014/0270544 | A1 * | 9/2014 | Chiang | G06T 7/12 |
| | | | | 382/215 |
| 2017/0262163 | A1 * | 9/2017 | Nimura | G06V 10/17 |
| 2018/0276790 | A1 * | 9/2018 | Mantor | G06T 15/80 |
| 2019/0057536 | A1 * | 2/2019 | Fenney | G02B 27/017 |
| 2020/0184027 | A1 * | 6/2020 | Dolan | G01S 13/931 |
| 2020/0260060 | A1 * | 8/2020 | De La Cruz | H04N 9/3185 |
| 2020/0285309 | A1 * | 9/2020 | Mccombe | G06T 11/00 |

FOREIGN PATENT DOCUMENTS

| | | | | |
|---|---|---|---|---|
| GB | 2232861 | A * | 12/1990 | G06T 11/203 |
| GB | 2232861 | A | 12/1990 | |

OTHER PUBLICATIONS

"International Search Report and Written Opinion", dated Jul. 13, 2022, from the counterpart PCT application PCT/US22/23745.

* cited by examiner

*Primary Examiner* — Michael Le
(74) *Attorney, Agent, or Firm* — John L. Rogitz; John M. Rogitz (57) ABSTRACT

A technique iteratively fits a rasterization distortion function to a distortion property of a display such as a head-mounted display (HMD). The technique also features reconstructing a distortion function from a rendered image with unknown distortion property.

13 Claims, 11 Drawing Sheets

ESTIMATION OF OPTIMAL RASTERIZATION DISTORTION FUNCTION FROM IMAGE DISTORTION PROPERTY

FIELD

The present application relates to technically inventive, non-routine solutions that are necessarily rooted in computer technology and that produce concrete technical improvements.

BACKGROUND

As understood herein, displays such as head-mounted displays (HMD) that are used to present images such as computer simulation video images may use processors such as graphics processor units (GPUs) to turn geometry into pixels using a process called rasterization. As also understood herein, for a variety of reasons, displays can have distortions that can adversely affect the visual presentation of the rasterized image.

SUMMARY

As further understood herein, a rasterized image typically has a uniform pixel density. Flexible scale rasterization (FSR) has been introduced to enable developers to control the pixel density across the rendered image, such that a non-uniform pixel spacing is achieved during rasterization. An FSR curve may be defined by an FSR function that is a piecewise function, where each interval is a curve, whose shape is defined by the size (width, and height) of the interval, and a user defined constant alpha. The user can set an alpha value per interval, and they can control the sizes of the intervals using a set of control points. In one non-limiting example, an FSR function may be a hyperbolic function with constant alpha, in one example, with seven control points.

FSR finds use with, among other displays, virtual reality (VR) head-mounted displays (HMD). Such displays can require a lens distortion correction pass, with pixel density post-distortion being non-uniform, which is a problem when the submitted image has a uniform distortion. FSR allows rendering the image with a pixel density similar to the post-distortion image. An example non-limiting FSR algorithm may have seven control points with a curve between points being defined by a hyperbolic alpha function (with a constant alpha) with eight additional values.

Present principles recognize that the FSR function can be unintuitive to work with, that mapping a FSR function to an arbitrary distortion (such as VR lens distortion) can be time consuming, and challenging, and in some cases the distortion function may not even be known to the developer. Present principles understand that a quick and intuitive technique is needed to map a FSR function to any given distortion. Present principles thus allow for improving image presentation on a computer display such as but not limited to a HMD by optimizing a graphics processing unit (GPU) rasterization distortion function for foveated rendering that matches a given distortion property, such as the lens optics of a virtual reality (VR) HMD.

A technique is set forth herein to iteratively fit a rasterization distortion function to a distortion property of a display. The technique may also be used for reconstructing a distortion function from a rendered image with unknown distortion property.

Accordingly, a device includes at least one computer memory that is not a transitory signal and that in turn includes instructions executable by at least one processor to identify at least one distortion function associated with at least one component of a display device. The instructions are executable to adapt at least one flexible scale rasterization (FSR) function to the distortion function at least in part by moving at least a first control point of plural control points of the FSR function along the FSR function from an initial location of the first control point until a longest portion of the FSR function satisfying a value is identified. Additional control points of the FSR function are moved from respective initial locations until respective longest portions of the FSR function satisfying a value are identified to render an adjusted FSR function. The adjusted FSR function is used to present at least one image on the display device.

In some embodiments the instructions are executable to identify the distortion function by receiving input of the at least one distortion function from a developer of a computer simulation. In other embodiments the instructions are executable to identify the distortion function by determining the distortion function using a checkerboard pattern presented on the display device.

In example implementations, the instructions may be executable for moving the first control point of the FSR function along the FSR function from an initial location of the first control point until a longest portion of the FSR function satisfying a value is identified at least in part by using a binary search. The binary search can entail moving the first control point from the initial location to a location midway between the initial location and a location at an end of a search range.

In examples disclosed herein, each of the respective longest portions is smaller than an immediately previously identified longest portion. Each successive search range may be shorter than an immediately preceding search range. An example FSR function may include seven control points.

In one implementation, the instructions are executable to fit the plural control points starting from fitting outer-most control points to fitting inner-most control points.

In another aspect, a method includes identifying a distortion function characterizing a display device. The method includes modifying a rasterization function according to the distortion function, and presenting at least one image on the display device using the rasterization function.

In another aspect, an apparatus includes at least one display device and at least one processor programmed with instructions which when executed by the at least one processor configure the processor to move at least one control point of at least one rasterization function from an initial location to a new location. The instructions are executable to render a modified rasterization function with the control point in the new location for use in presenting demanded images on the display device. The processor may be part of the display device or it may be part of another computerized device.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
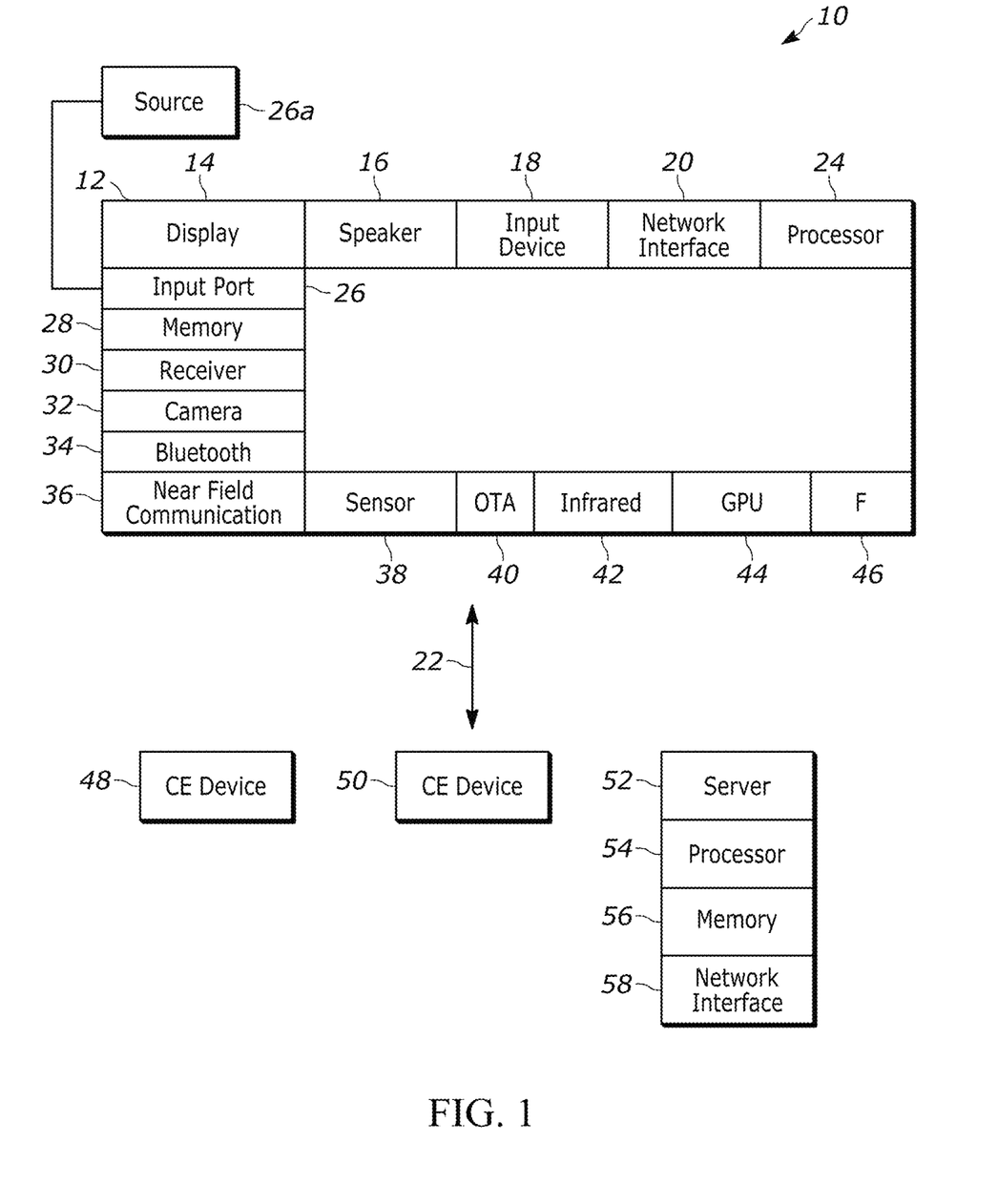
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1.

Figure 2:
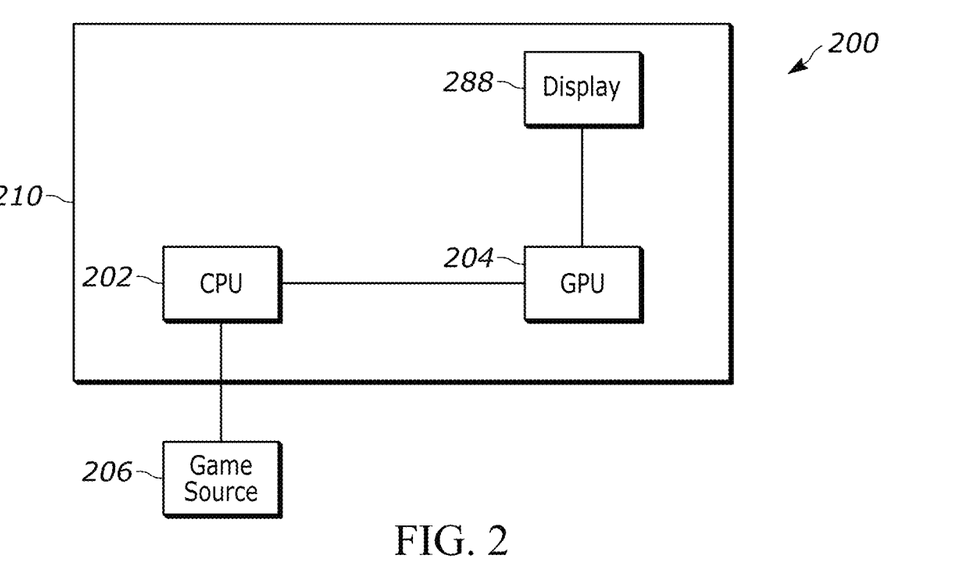
FIG. 2 illustrates an example simplified display system.

FIG. 2 illustrates a system 200 in which at least one central processing unit (CPU) 202 may communicate with at least one graphics processing unit (GPU) 204 to present images from a source 206 of computer simulations such as computer games to at least one display device 208, which may be embodied in, e.g., a HMD with lenses, display surfaces, and other components that may be characterized by distortions that can be represented by a distortion function. The source 206 may be a computer game console or an Internet server or other appropriate source. The CPU 202, GPU 204, and display device 208 may be incorporated in a single housing 210 or may be housed separately from each other in various housing combinations and configurations.

Figure 3:
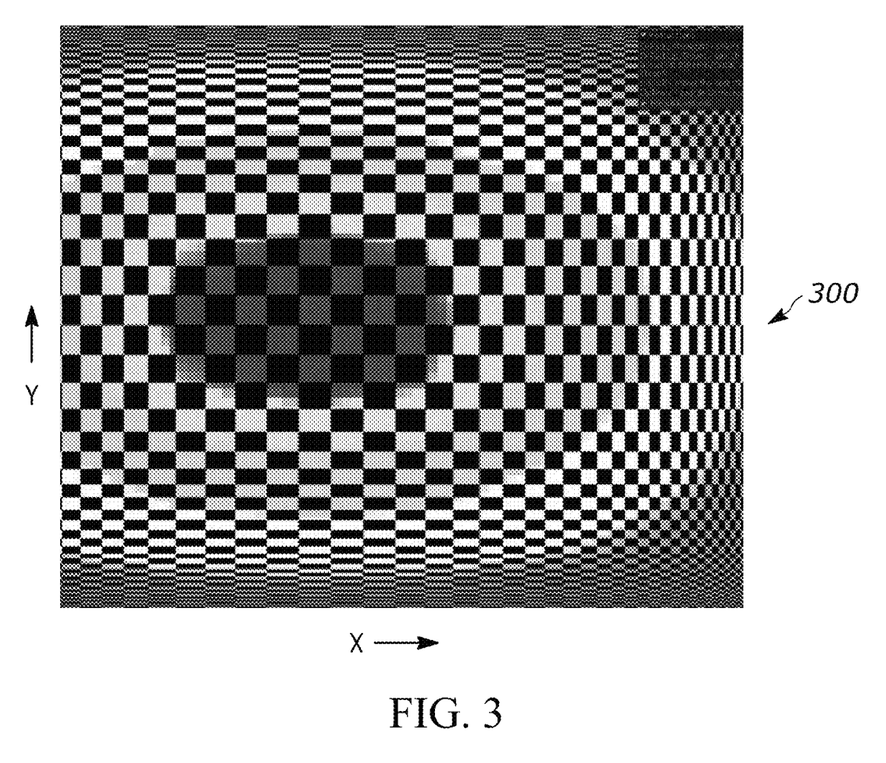
FIG. 3 illustrates a checkerboard pattern on a display rendered using FSR.

FIG. 3 illustrates a pixel pattern 300 that may be rendered by the GPU 204 on the display device 208 using as input a demanded image from the source 206. The GPU 204 renders the pixel pattern 300 such that pixel spacing is non-uniform across the display device in both the x- and y-dimensions (left-to-right and bottom-to-top in FIG. 3). In the example shown, pixel sizes also are not uniform, such that pixels in the center of the display are larger than pixels near the edges of the display. Such an arrangement may be useful for foveated rendering. The GPU may implement a rasterization function to establish the pixel pattern 300. The rasterization function thus establishes a first pixel resolution in at least a first display region of the display device and a second resolution in at least a second region of the display device. The rasterization function renders a demanded image into pixels. In examples discussed herein, the rasterization function can include at least one flexible scale rasterization (FSR) function.

Figure 4:
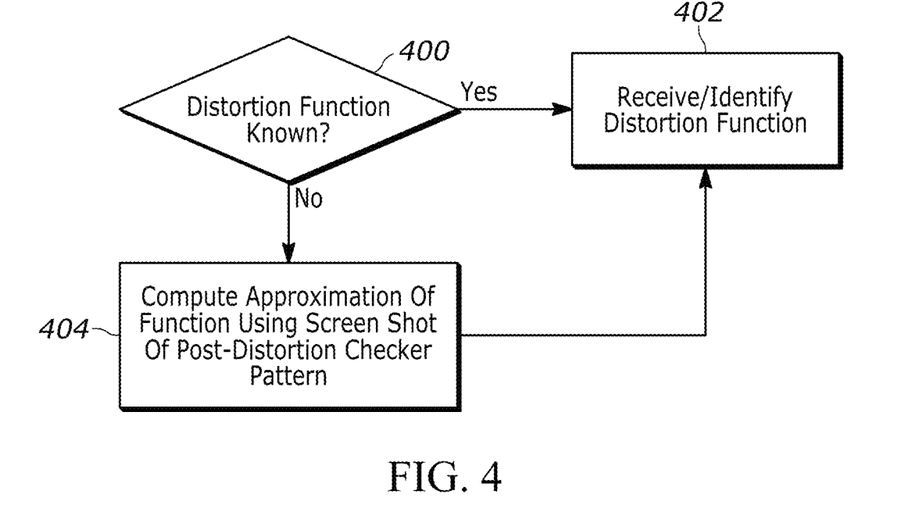
FIG. 4 illustrates example logic in example flow chart format for obtaining a distortion function of a lens or display.
Figure 5:
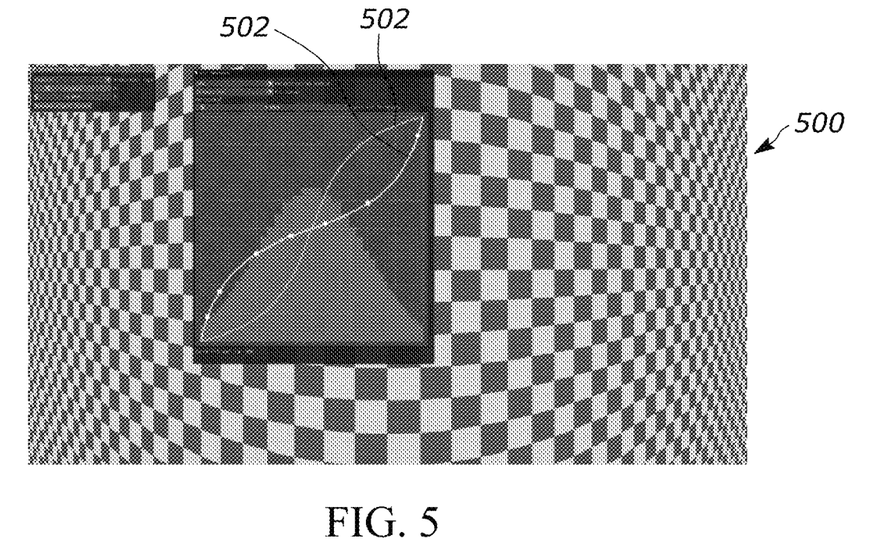
FIG. 5 illustrates an FSR curve and a distortion function overlaid on a checkerboard pattern on a display rendered using FSR.

FIGS. 4 and 5 illustrates a software tool to fit a rasterization function such as an FSR function to a distortion function that describes the distortion of a display device, such as lens distortions and/or display surface curvatures that may cause anomalies in images presented by the display device. If at decision diamond 400 it is determined that the distortion function is known, at block 402 the distortion function is received/identified as it is provided by, e.g., a game developer.

On the other hand, if the distortion function is not known, at block 404 an approximation of the distortion function is computed using, e.g., a checker pattern 500 such as that shown in FIG. 5. In the case of a virtual reality (VR) HMD, a regular (constant size checkers) checker pattern may be demanded as an image and a screenshot taken of the post-distortion image, with the distortion function be derived according to the non-uniformities observed in the screen shot. The curves 502 superimposed on the pattern 500 in FIG. 5 can represent a FSR function and/or distortion function. In other embodiments a GPU compute-based implementation of checker pattern reconstruction may be effected.

Figure 6:
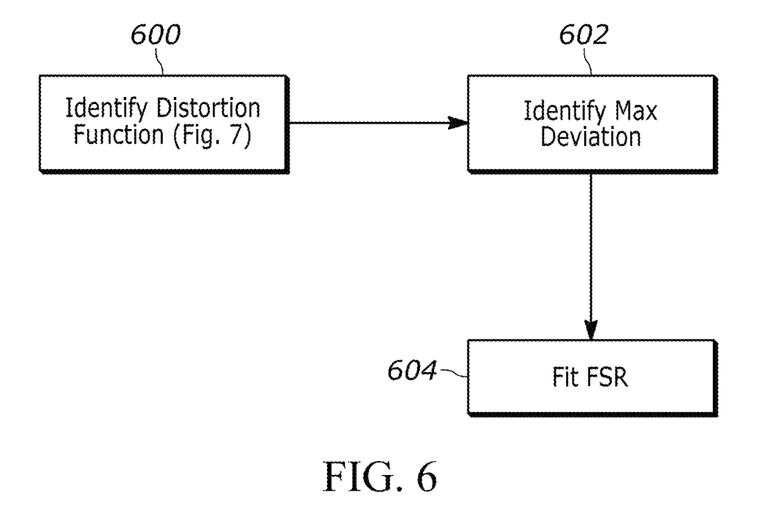
FIG. 6 illustrates example overall generalized logic in example flow chart format for fitting an FSR curve to a distortion function.
Figure 7:
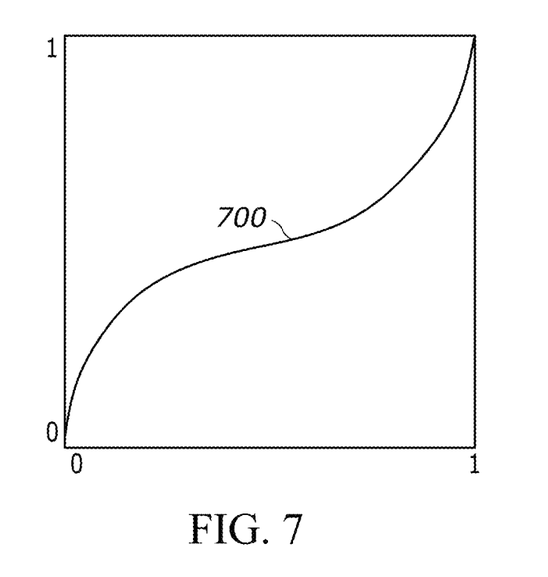
FIG. 7 illustrates an example distortion function.

FIGS. 6 and 7 illustrate that a distortion function 700 (FIG. 7) of a display device is identified at block 600 in FIG. 6 using techniques described herein. If desired, a maximum deviation that describes an acceptable tolerance for fitting an FSR function to the distortion function 700 may be received at block 602. At block 604, the FSR function is then fit to the distortion function 700 to within the error tolerance defined by the deviation received at block 602.

Thus, FIG. 6 illustrates the overall steps for identifying a distortion function characterizing a display device, and modifying a rasterization function such as an FSR function according to the distortion function, with the modified rasterization function being used for presenting at least one image on the display device.

Figure 8:
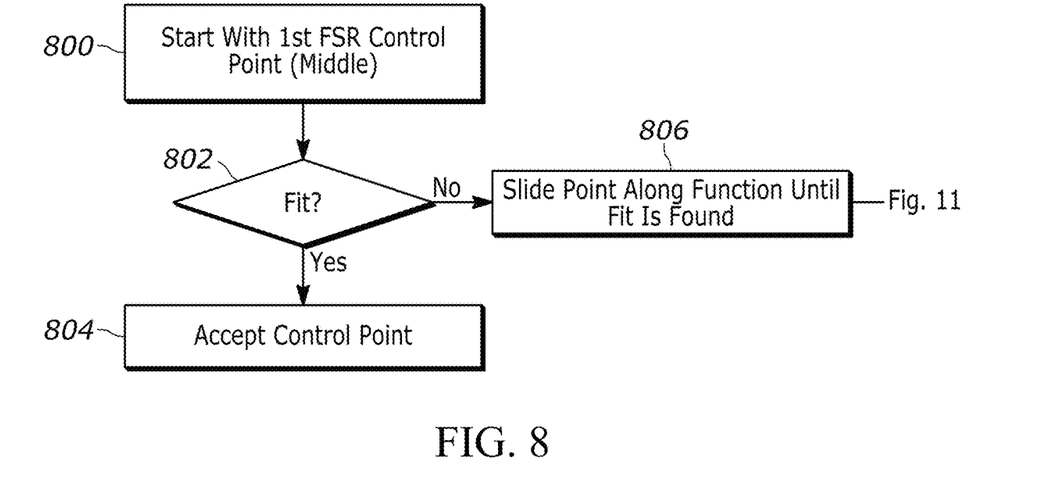
FIG. 8 illustrates example logic in example flow chart format for iteratively fitting an FSR curve to a distortion function.
Figure 9:
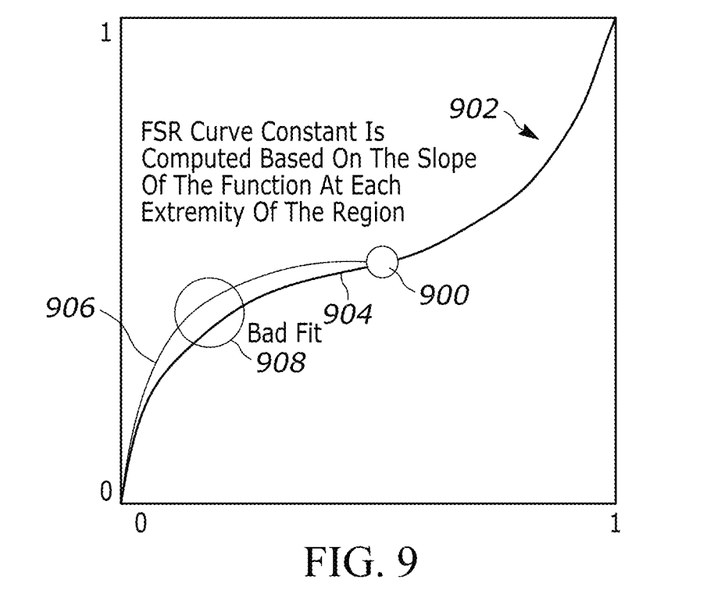
FIGS. 9 and 10 illustrate principles of a binary iterative search for fitting an FSR function.

FIGS. 8-10 illustrate details of one example. Commencing at block 800 in FIG. 8, a first FSR control point 900 (FIG. 9) is positioned in the center of an FSR curve 902. Proceeding to decision diamond 802, it is determined whether the half of the curve on one side of the control point 900 (in the example shown, the left half 904) fits the distortion function 906 within the deviation value input by the user. To do this, the FSR curve constant is computed based on the slope of the function (taking the derivative of the function) at each extremity of the region under test, in this case, the entire half of the FSR curve 902 from the initial position of the first control point 900 in the middle of the curve to the left-most end of the curve.

Figure 10:
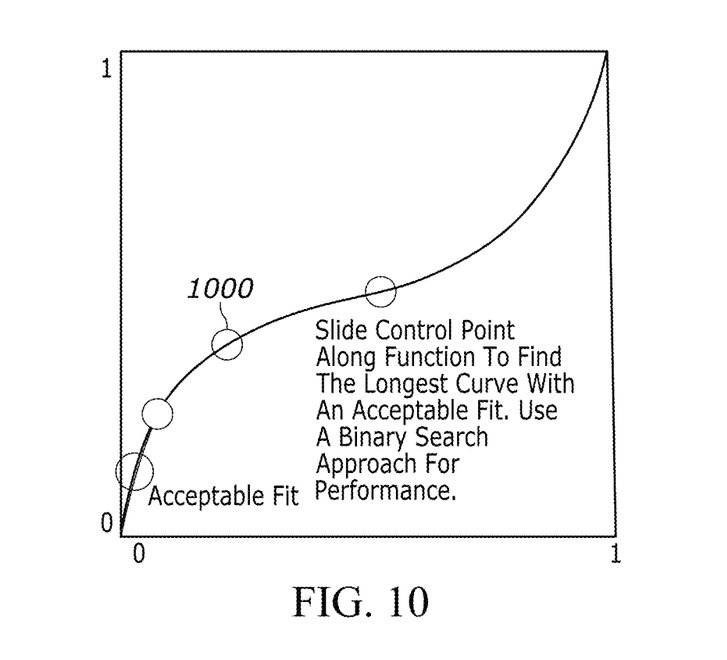

If the portion of the curve under test fits, the position of the control point is accepted at block 904. On the other hand, if the portion does not fit as indicated at 908 in the example of FIG. 9, the first control point 900 is moved at block 806 ("slid" as expressed in various parts of this application) to the middle of the portion under test, in this case, the middle 1000 shown in FIG. 10 of the left-hand half of the FSR curve.

The intention is to eventually find the longest segment of the FSR curve with an acceptable fit of the distortion curve, and so the binary search described herein is a technique for doing so.

Figure 11:
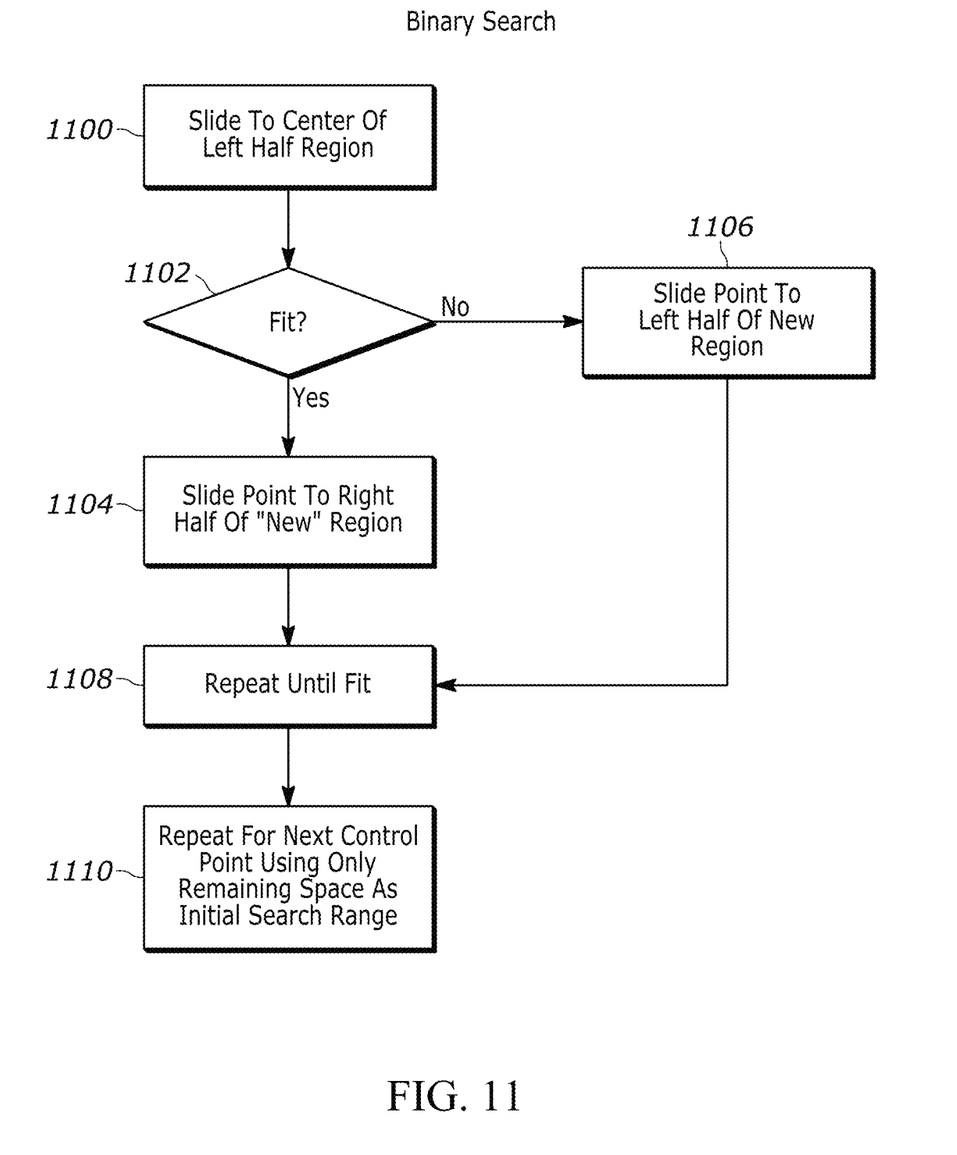
FIG. 11 illustrates example logic in example flow chart format for detailed fitting of an FSR function with, as an example, seven control points.

FIG. 11 at block 1100 takes up where FIG. 8 leaves off, with a negative test at decision diamond 802 causing the first control point 900 to be moved to the middle 1000 of the left portion of the FSR curve. The test for fitting described above is executed at decision diamond 1102 by again computing the FSR curve constant at each extremity of the region under test, in this case, the quarter of the FSR curve 902 from the middle 1000 of the left portion to the left-most end of the curve.

If the portion of the FSR curve under test (at this stage, the left quarter) fits, the logic moves to block 1104 to move, to the right, the control to the middle of the quarter of the FSR curve that extends from the mid-point 1000 of the left half to the center position 900 of the entire curve. On the other hand, if the curve segment under test does not fit at decision diamond 1102, the control point is moved to the left, to the middle of the left-most quarter of the entire FSR curve. In both cases the fit test is performed again, and block 1108 indicates that this binary process is repeated until the search range reduces to zero, i.e., that the longest possible segment of the FSR curve is found that fits the distortion curve.

Block 1110 indicates that once the location of the first control point (labeled "P0" in FIG. 12) is established according to the technique above, the next control point is similarly moved along the FSR curve until a longest segment that fits the distortion curve is identified. FIGS. 12-17 illustrate further.

Figure 12:
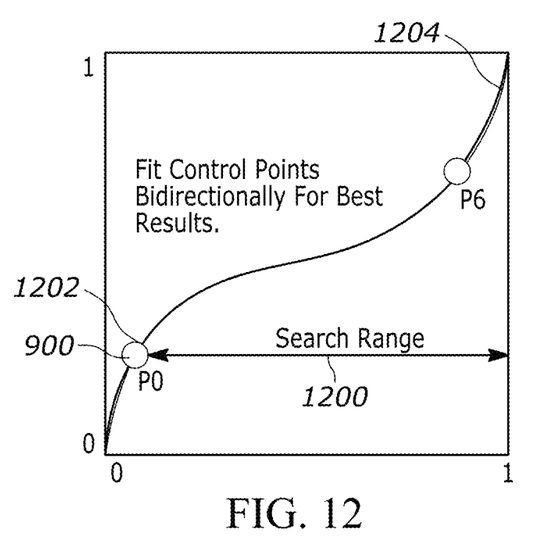
FIG. 12-18 illustrate stages in the fitting process described in FIG. 11.

In FIG. 12 and assuming an FSR curve with seven control points, i.e., P0-P6, the second control point to be resolved, in this case, P6, is analyzed according to the technique described above, with the FSR curve segment 1200 under test (the search range) extending initially from the final location 1202 of the first control point 900 ("P0") to the right-most end 1204 of the entire FSR control point. Thus, only the remaining portion of the FSR curve after establishing the location of the control point P0 is used for the initial search range for the second control point P6.

Figure 13:
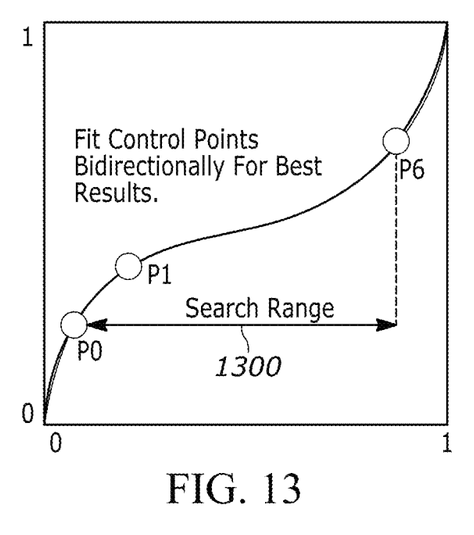
Figure 14:
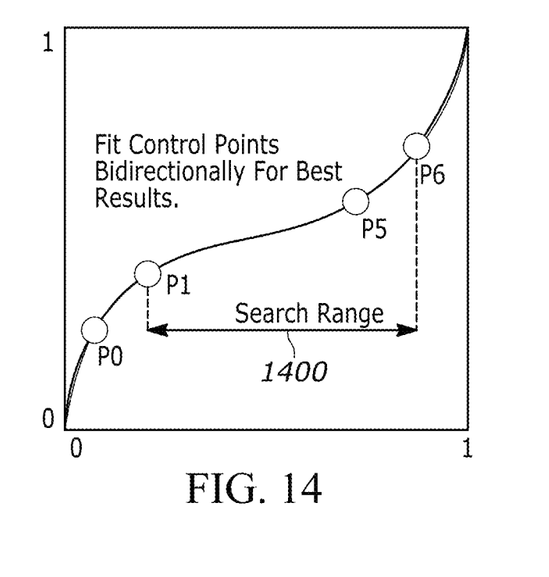
Figure 15:
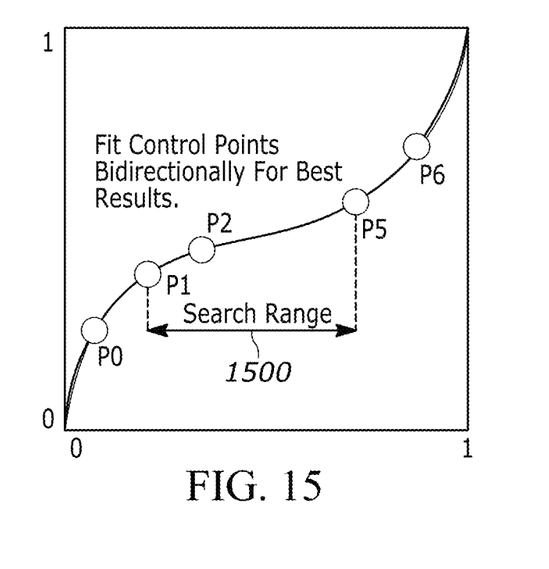
Figure 16:
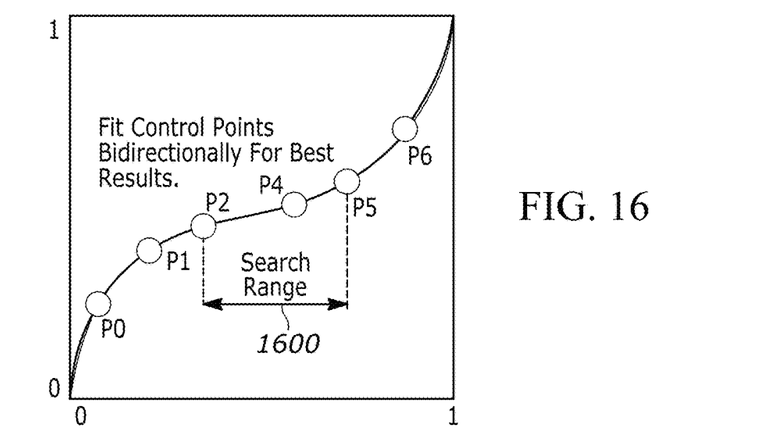
Figure 17:
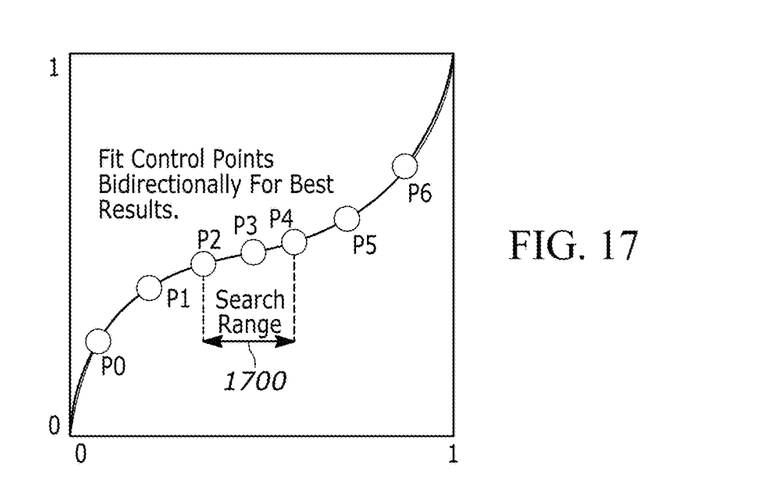

For best results, the control points are fitted bidirectionally (outer-most points first), so that using the numbering convention in the Figures, control point P0 is located first, then P6 (FIG. 12), then P1 (FIG. 13, with only the remaining portion of the FSR curve after establishing the location of the immediately preceding control point being used for the initial search range 1300). Once control point P1 has been located as described, control point P5 (FIG. 14, with only the remaining portion of the FSR curve after establishing the location of the immediately preceding control point being used for the initial search range 1400) is located to establish a longest-segment fit according to techniques herein.

Once control point P5 has been located as described, control point P2 (FIG. 15, with only the remaining portion of the FSR curve after establishing the location of the immediately preceding control point being used for the initial search range 1500) is located to establish a longest-segment fit according to techniques herein. Once control point P2 has been located as described, control point P4 (FIG. 16, with only the remaining portion of the FSR curve after establishing the location of the immediately preceding control point being used for the initial search range 1600) is located to establish a longest-segment fit according to techniques herein. Once control point P4 has been located as described, control point P3 (FIG. 17, with only the remaining portion of the FSR curve after establishing the location of the immediately preceding control point being used for the initial search range 1700) is located to establish a longest-segment fit according to techniques herein.

Figure 18:
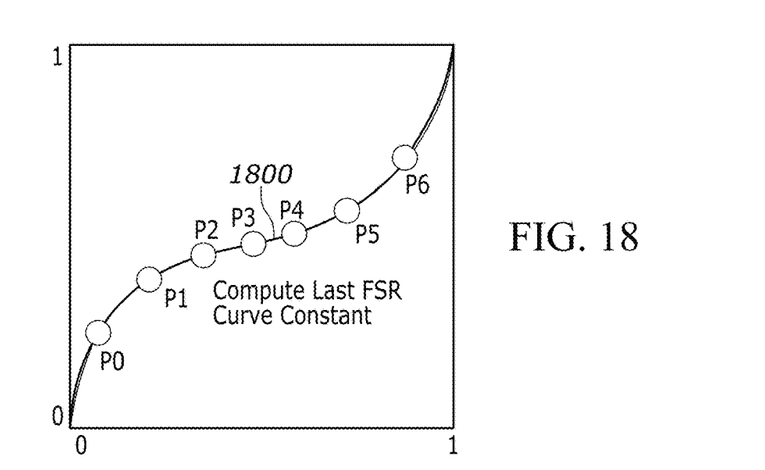

It may be appreciated that a segment of the FSR curve remains between the last and penultimate control point locations computed according to the above technique. FIG. 18 indicates that for this remaining segment 1800, the curve constant is computed to complete the modification of the FSR curve to fit the distortion curve.

Figure 19:
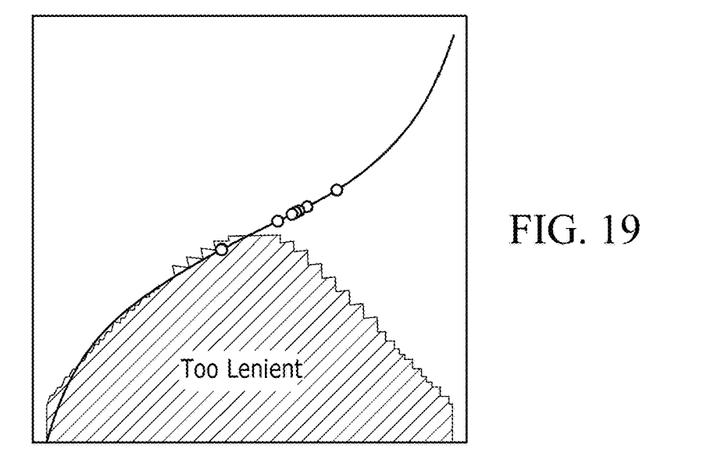
FIGS. 19-21 illustrate, respectively, a too lenient fit, a "just right" fit, and a too strict fit.
Figure 20:
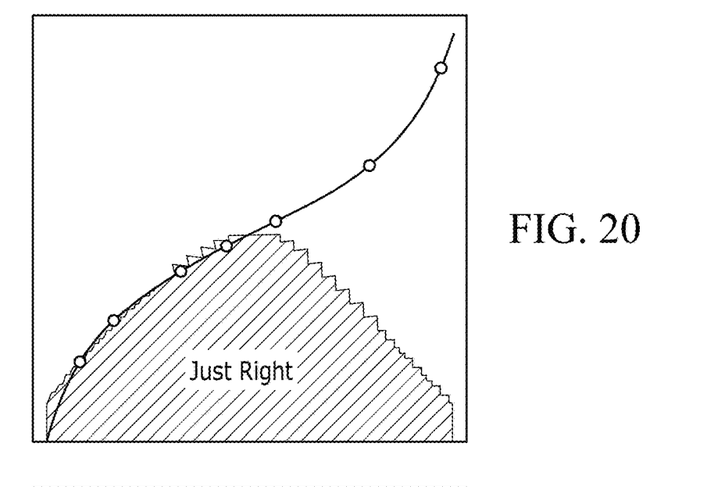
Figure 21:
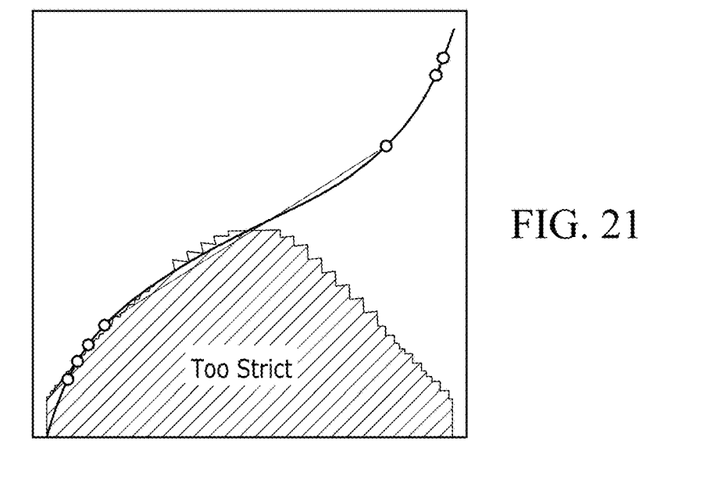

FIGS. 19-21 illustrate that picking the right threshold (the input deviation value received at block 602 in FIG. 6) can improve the results. In FIG. 19 the deviation value is too large, resulting in clustering of the control points near the middle of the curve, in FIG. 20 just right, resulting in comparatively uniform distribution of the control points along the FSR curve, and in FIG. 21 it is too small, resulting in clustering of control points near both ends of the FSR curve. It is possible to automatically find the best fit by repeating the process using different thresholds, although this may not be suitable for real-time applications.

The above technique as embodied by the example figures may be implemented as an interface with a software development kit (SDK) that wraps around the FSR interface to set register settings positions of control points. This provides a higher-level interface that takes a distortion function or other function and fits FSR and function to it using values between zero and 1, not compressed integers.

It is to be understood that the above curve-fitting may take place in both x- and y-directions to yield two modified FSR curves.

In some examples the above process may be made transparent to the user/developer by automatically fitting the FSR curve to, e.g., a distortion curve by looking at raw pixel values being received.

Applications and use cases include fitting an FSR function to any post-process distortion, foveated rendering: quickly prototype different shapes for the resolution function to see which one looks best, interact with FSR at a high level (i.e., visual tool usable by artists, designers, etc.), and enables exploration of new use cases for FSR. Use cases include lens-matched shading in which pixel density of VR HMD lenses is matched; VR foveated rendering in which higher resolution is effected in the portion of the display where eye tracking indicates the user's gaze is fixated, with resolution being reduced everywhere else on the display; wide angle rendering using post-process reprojection (Pannini reprojection, Pannini projection for wide FOV rendering to reduce distortion); rendering special effects such as distortion when looking through a simulated sniper scope in a computer simulation.

It will be appreciated that whilst present principals have been described with reference to some example embodiments, these are not intended to be limiting, and that various alternative arrangements may be used to implement the subject matter claimed herein.

What is claimed is:

1. A device comprising:
    at least one computer memory that is not a transitory signal and that comprises instructions executable by at least one processor to:
    identify at least one distortion function associated with at least one component of a display device;
    adapt at least one flexible scale rasterization (FSR) function to the distortion function at least in part by:
    moving at least a first control point of plural control points of the FSR function along the FSR function from an initial location of the first control point until a longest portion of the FSR function satisfying a value is identified;
    moving additional control points of the FSR function from respective initial locations until respective longest portions of the FSR function satisfying a value are identified to render an adjusted FSR function; and
    using the adjusted FSR function to present at least one image on the display device, wherein the FSR comprises a piecewise function having plural intervals each of which is a curve whose shape is defined by a size of the respective interval and an alpha value.

2. The device of claim 1, wherein the instructions are executable to identify the at least one distortion function by receiving input of the at least one distortion function from a developer of a computer simulation.

3. The device of claim 1, wherein the instructions are executable to identify the at least one distortion function by determining the distortion function using a checkerboard pattern presented on the display device.

4. The device of claim 1, wherein the instructions are executable for moving the first control point of the FSR function along the FSR function from an initial location of the first control point until a longest portion of the FSR function satisfying a value is identified at least in part by using a binary search.

5. The device of claim 4, wherein the binary search comprises moving the first control point from the initial location to a location midway between the initial location and a location at an end of a search range.

6. The device of claim 5, wherein each successive search range is shorter than an immediately preceding search range.

7. The device of claim 1, wherein each of the respective longest portions is smaller than an immediately previously identified longest portion.

8. The device of claim 1, wherein the FSR function comprises seven control points.

9. The device of claim 1, wherein the instructions are executable to fit the plural control points starting from fitting outer-most control points to fitting inner-most control points.

10. The device of claim 1, further comprising the at least one processor executing the instructions.

11. An apparatus, comprising:
    at least one display device;
    at least one processor programmed with instructions which when executed by the at least one processor configure the at least one processor to:
    move at least one control point of at least one rasterization function from an initial location to a new location; and
    render a modified rasterization function with the at least one control point in the new location for use in presenting demanded images on the display device, wherein the rasterization function comprises a piecewise function having plural intervals at least one of which is a curve whose shape is defined by a size of the respective interval and a value.

12. The apparatus of claim 11, wherein the instructions are executable to:
    move the at least one control point of the at least one rasterization function from the initial location to the new location to fit the at least one rasterization function to a distortion function that is characteristic of the display device.

13. The apparatus of claim 11, wherein the at least one rasterization function comprises a flexible scale rasterization (FSR) function.

* * * * *